(12) United States Patent
Higashi et al.

(10) Patent No.: US 9,007,649 B2
(45) Date of Patent: Apr. 14, 2015

(54) CARD PRINTING DEVICE AND CONTROL METHOD FOR CARD PRINTING DEVICE

(75) Inventors: Katsuhisa Higashi, Nagano (JP); Keiji Ohta, Nagano (JP)

(73) Assignee: Nidec Sankyo Corporation (JP)

( * ) Notice: Subject to any disclaimer, the term of this patent is extended or adjusted under 35 U.S.C. 154(b) by 0 days.

(21) Appl. No.: 14/232,577

(22) PCT Filed: Jul. 11, 2012

(86) PCT No.: PCT/JP2012/067691
§ 371 (c)(1),
(2), (4) Date: Jan. 13, 2014

(87) PCT Pub. No.: WO2013/008845
PCT Pub. Date: Jan. 17, 2013

(65) Prior Publication Data
US 2014/0132967 A1     May 15, 2014

(30) Foreign Application Priority Data

Jul. 13, 2011 (JP) ................................. 2011-155275

(51) Int. Cl.
| | |
|---|---|
| *G06F 15/00* | (2006.01) |
| *G06K 1/00* | (2006.01) |
| *G06K 15/10* | (2006.01) |
| *B41J 35/04* | (2006.01) |
| *B41J 35/38* | (2006.01) |
| *B41J 17/38* | (2006.01) |
| *G06K 15/02* | (2006.01) |
| *G06K 15/16* | (2006.01) |
| *G06K 15/00* | (2006.01) |

(52) U.S. Cl.
CPC ...... *B41J 35/04* (2013.01); *B41J 35/38* (2013.01); *B41J 17/38* (2013.01); *G06K 15/028* (2013.01); *G06K 15/16* (2013.01); *G06K 15/4065* (2013.01)

(58) Field of Classification Search
CPC . G06K 15/16; G06K 15/028; G06K 15/4065; B41J 35/04; B41J 35/38
USPC ................................ 358/1.1, 1.15, 1.16, 1.18
See application file for complete search history.

(56) References Cited

U.S. PATENT DOCUMENTS

| | | | |
|---|---|---|---|
| 2009/0115831 A1 * | 5/2009 | Mochizuki | 347/214 |
| 2011/0050832 A1 * | 3/2011 | Aihara et al. | 347/215 |

FOREIGN PATENT DOCUMENTS

| JP | 1-122452 A | 5/1989 |
|---|---|---|
| JP | 3-275364 A | 12/1991 |
| JP | 2000-327196 A | 11/2000 |
| JP | 2004-82595 A | 3/2004 |
| JP | 2010-115861 A | 5/2010 |

OTHER PUBLICATIONS

International Search Report for International Application No. PCT/JP2012/067691, mailed Aug. 14, 2012, with English translation.

* cited by examiner

*Primary Examiner* — Douglas Tran
(74) *Attorney, Agent, or Firm* — Cantor Colburn LLP

(57) ABSTRACT

A card printing device may include a card conveying mechanism which conveys the card through a card conveying passage; a printing mechanism which transfers and prints ink applied to an ink ribbon on the card which is conveyed along the card conveying passage; and a print control section which controls printing on the card. The print control section may divide a printing image into a plurality of divided images in a conveyance direction of the card, rearrange an arrangement order of the divided images in the conveyance direction, control the card conveying mechanism to move the card forward or backward so that the divided images are printed on the card in a rearranged order and, so that the card is printed with the divided images in an original arrangement order before having been rearranged and then, perform printing on the card by the printing mechanism.

7 Claims, 7 Drawing Sheets

CARD PRINTING DEVICE AND CONTROL METHOD FOR CARD PRINTING DEVICE

CROSS REFERENCE TO RELATED APPLICATIONS

This is the U.S. national stage of application No. PCT/JP2012/067691, filed on 11 Jul. 2012. Priority under 35 U.S.C. §119(a) and 35 U.S.C. §365(b) is claimed from Japanese Application No. 2011-155275, filed 13 Jul. 2011, the disclosure of which is also incorporated herein by reference.

FIELD OF THE INVENTION

The present invention relates to a card printing device in which ink applied on an ink ribbon is transferred to and printed on a card. Further, the present invention relates to a control method for the card printing device.

BACKGROUND

Conventionally, a thermal transfer type printing device has been widely utilized in which an ink ribbon is heated by a thermal head and ink applied on the ink ribbon is transferred to and printed on a printing medium. In the printing device, ink having a shape which is the same as an image printed on the printing medium is printed from the ink ribbon and thus, after the printing is performed, a printed trace of ink having the same shape as the printed image is left on the ink ribbon. Therefore, when the printed trace is observed or, when the portion of the ink ribbon where ink has not been printed is thermally transferred again, the image printed on the printing medium can be recognized easily.

In recent years, a card issuing system including a thermal transfer type printing device in which, when a card is conveyed through a card conveying passage, character information or the like is printed on a surface of a card by a thermal head, a hot stamp or the like has been increasingly installed in a store of a financial institution such as a bank. In the printing device for the card issuing system, there may occur a problem that an administrator of the device can easily obtain the image printed on the card from a printed trace of ink which is left in the used ink ribbon, or that a third person can easily obtain the image printed on the card from a printed trace of ink which is left in the used ink ribbon having been discarded. This is an issue to be solved in these days when protection of personal information is regarded very important.

Conventionally, a thermal transfer type printing device has been proposed which is capable of solving the above-mentioned problem (see, for example, Patent Literature 1). In the printing device described in Patent Literature 1, an image which is to be printed on a printing paper is divided into plural portions in a conveyance direction of the printing paper and, when respective portions of the divided images are to be printed, portions to be used of the ink ribbon are randomly changed by using a fast forwarding operation and a rewinding operation of the ink ribbon. Therefore, in the printing device, unless printed traces of ink which are left on the ink ribbon having been used are analyzed in detail, the image printed on the printing paper cannot be obtained and, as a result, personal information printed on the printing paper is protected.

PATENT LITERATURE

[PTL 1] Japanese Patent Laid-Open No. 2010-115861

However, in the printing device described in Patent Literature 1, since a rewinding operation of the ink ribbon is performed, a mechanism for feeding an ink ribbon in a reverse direction is required in addition to a mechanism for feeding the ink ribbon in a forward direction. Therefore, in the printing device, the structure of the device is complicated and, as a result, a cost of the device is increased.

SUMMARY

In view of the problem described above, at least an embodiment of the present invention provides a card printing device which is capable of simplifying a structure of the device while a printing image having been printed on the card is prevented from being easily acquired from the printed traces of the ink which are left in the used ink ribbon. Further, in view of the problem described above, at least an embodiment of the present invention provides a control method for a card printing device in which a structure of the card printing device is capable of being simplified while a printing image having been printed on the card is prevented from being easily acquired from the printed traces of the ink which are left in the used ink ribbon.

In order to attain the above, at least an embodiment of the present invention provides a card printing device including a card conveying mechanism which conveys a card through a card conveying passage, a printing mechanism which transfers and prints ink applied to an ink ribbon on the card which is conveyed along the card conveying passage, and a print control section which controls printing on the card. The print control section divides a printing image to be printed on the card into a plurality of divided images in a conveyance direction of the card, rearranges an arrangement order of the divided images in the conveyance direction of the card, controls the card conveying mechanism to move the card forward or backward so that the divided images are printed on the card in a rearranged order and, so that the card is printed with the divided images in an original arrangement order before having been rearranged and then, performs printing on the card by the printing mechanism.

In the card printing device in accordance with at least an embodiment of the present invention, the print control section divides a printing image to be printed on the card into a plurality of divided images in a conveyance direction of the card, rearranges an arrangement order of the divided images in the conveyance direction of the card, controls the card conveying mechanism to move the card forward or backward so that the divided images are printed on the card in a rearranged order and, so that the card is printed with the divided images in an original arrangement order before having been rearranged and then, performs printing on the card by the printing mechanism. Therefore, in at least an embodiment of the present invention, randomly arranged printed traces of the ink having the same shape as the divided images are left in the used ink ribbon. Accordingly, in at least an embodiment of the present invention, unless the printed traces which are left in the used ink ribbon are analyzed in detail, the printing image which is printed on the card cannot be acquired. In other words, in at least an embodiment of the present invention, the printing image to be printed on the card can be prevented from being easily acquired from the printed traces of the ink which are left in the used ink ribbon. Further, in at least an embodiment of the present invention, the card is moved forward or backward by the card conveying mechanism so that the divided images whose arrangement order has been rearranged are printed on the card in the order of the arrangement order having been rearranged in the conveyance direction of the card and, so that the card is printed with the divided images in the original arrangement order before having been rearranged in the conveyance direction of the card. Therefore, a mechanism for feeding the ink ribbon in a reverse direction is not required to provide in the card printing device. Accordingly, in at least an embodiment of the present invention, the structure of the card printing device can be simplified.

In at least an embodiment of the present invention, it is preferable that the printing image is a code table comprised of a plurality of digits or a plurality of characters, and the print control section divides the printing image into a plurality of divided images at positions corresponding to delimitations of the plurality of the digits or the plurality of the characters. According to this structure, the respective digits or the respective characters of a code table are accurately printed on the card while preventing the code table having a high confidentiality from being easily acquired from the printed traces of the ink which are left in the used ink ribbon.

Further, in order to attain the above, at least an embodiment of the present invention provides a control method for a card printing device having a card conveying mechanism structured to convey a card through a card conveying passage, and a printing mechanism which transfers and prints ink applied to an ink ribbon on the card which is conveyed along the card conveying passage. The control method includes an image dividing step in which a printing image to be printed on the card is divided into a plurality of divided images in a conveyance direction of the card, an arrangement order rearranging step in which an arrangement order of the divided images in the conveyance direction of the card is rearranged, and a print step in which the card conveying mechanism is controlled to move the card forward or backward so that the divided images are printed on the card in a rearranged order and, so that the card is printed with the divided images in an original arrangement order before having been rearranged and then printing on the card is performed by the printing mechanism.

In the control method for a card printing device in accordance with at least an embodiment of the present invention, in the image dividing step, a printing image to be printed on the card is divided into a plurality of divided images in a conveyance direction of the card and, in the arrangement order rearranging step, an arrangement order of the divided images in the conveyance direction of the card is rearranged and, in the print step, the card conveying mechanism is controlled to move the card forward or backward so that the divided images are printed on the card in a rearranged order and, so that the card is printed with the divided images in an original arrangement order before having been rearranged and then, printing on the card is performed by the printing mechanism. Therefore, when the control method in accordance with at least an embodiment of the present invention is used, randomly arranged printed traces of the ink having the same shape as the divided images are left in the used ink ribbon. Accordingly, when the control method in accordance with at least an embodiment of the present invention is used, unless the printed traces which are left in the used ink ribbon are analyzed in detail, the printing image which is printed on the card cannot be acquired. In other words, when the control method in accordance with at least an embodiment of the present invention is used, the printing image having been printed on the card can be prevented from being easily acquired from the printed traces of the ink which are left in the used ink ribbon. Further, in the control method in accordance with at least an embodiment of the present invention, in the print step, the card is moved forward or backward by the card conveying mechanism so that the divided images whose arrangement order has been rearranged are printed on the card in the order of the arrangement order having been rearranged in the conveyance direction of the card and, so that the card is printed with the divided images in the original arrangement order before having been rearranged in the conveyance direction of the card. Therefore, a mechanism for feeding the ink ribbon in a reverse direction is not required to provide in the card printing device. Accordingly, when the control method in accordance with at least an embodiment of the present invention is used, the structure of the card printing device can be simplified.

In at least an embodiment of the present invention, for example, in the print step, after one divided image is printed on the card, the card is directly moved forward or backward to a print position for the next divided image. In this case, a printing time of the printing image on the card can be shortened. Further, in at least an embodiment of the present invention, it may be controlled that, in the print step, the card is moved forward or backward to a predetermined home position before printing of each of the plurality of the divided images is performed on the card, and then the card is moved forward or backward to a print position of the divided image. In this case, stopping accuracy of the card can be enhanced and thus accuracy of the print positions of the respective divided images with respect to the card can be enhanced.

In at least an embodiment of the present invention, it is preferable that the card is printed with the printing image and a second printing image which are printed in a separated state with a predetermined distance therebetween in a direction perpendicular to the conveyance direction of the card and a thickness direction of the card, and the second printing image is printed in a second print step which is separately provided from the image dividing step, the arrangement order rearranging step and the print step. For example, in a case that the printing image is a code table comprised of a predetermined digit string and the second printing image is a name of a card owner, there may occur that the positions of the digits structuring the code table and the positions of the characters structuring the name are displaced from each other in the conveyance direction of the card. In this case, when the second printing image is divided into a plurality of divided images in the conveyance direction of the card together with the printing image and an arrangement order of the divided images in the conveyance direction of the card is rearranged and the divided images are printed on the card in the rearranged order having been rearranged, for example, one of the characters structuring the second printing image may be divided halfway and inconsistency occurs in its connected portion and thus, the second printing image may not be printed adequately. On the other hand, when the second printing image is printed according to the second print step which is separately provided from the image dividing step, the arrangement order rearranging step and the print step, occurrence of the above-mentioned problem is prevented and the second print image is adequately printed on the card.

Further, for example, when the printing image is a code table comprised of a predetermined digit string and the second printing image is a name of a card owner, even in a case that the printed traces of the ink having the same shape as the randomly arranged divided images of the name are left in the used ink ribbon, there are cases that the name of the card owner printed on the card may be relatively easily analyzed and acquired from the printed traces. Therefore, when the second printing image is divided into a plurality of divided images in the conveyance direction of the card together with the printing image and an arrangement order of the divided images in the conveyance direction of the card is rearranged and the divided images are printed on the card in the rearranged order having been rearranged, not only the images of the name of the card owner but also the image of the code table may be relatively easily acquired from the printed traces of the ink having the same shape as the divided images left in the used ink ribbon. On the other hand, in a case that the second printing image is printed according to the second print step which is separately provided from the image dividing step, the arrangement order rearranging step and the print step, the name of the card owner can be printed by using a portion of the ink ribbon which is different from a portion of the ink ribbon used for printing the code table in a longitudinal direction of the ink ribbon. Therefore, even when the image of the name of the card owner is easily acquired from the printed traces of the ink which are left in the ink ribbon, the image of the code table can be prevented from being acquired easily.

In at least an embodiment of the present invention, it is preferable that the printing image is a code table comprised of a plurality of digits or a plurality of characters and, in the image dividing step, the printing image is divided into a plurality of divided images at positions corresponding to delimitations of the plurality of the digits or the plurality of the characters. According to this structure, the respective digits and the respective characters of the code table are accurately printed on the card while preventing the code table having a high confidentiality from being easily acquired from the printed traces of the ink which are left in the used ink ribbon.

As described above, according to at least an embodiment of the present invention, the structure of the card printing device is capable of being simplified while the printing image having been printed on the card is prevented from being easily acquired from the printed traces of the ink which are left in the used ink ribbon.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DESCRIPTION OF EMBODIMENTS

Embodiments of the present invention will be described below with reference to the accompanying drawings.

Structure of Card Printing Device

Figure 1:
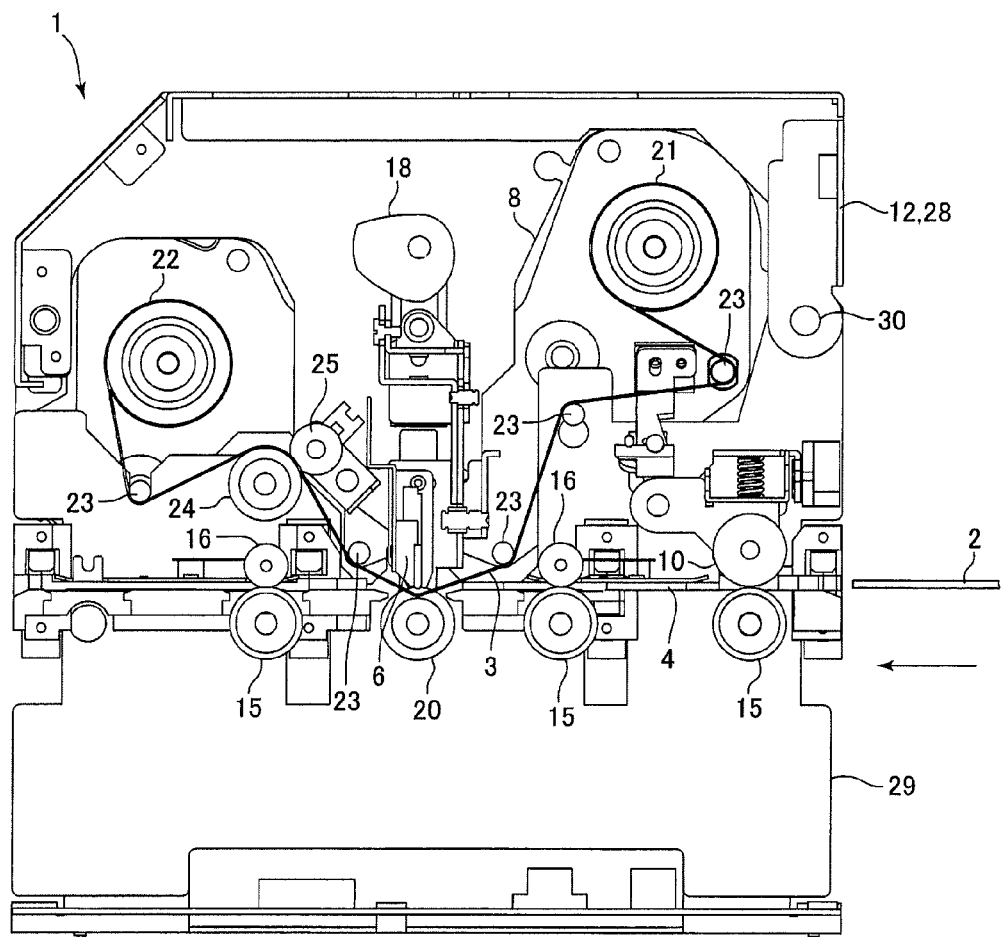
FIG. 1 is an explanatory side view showing an internal structure of a card printing device in accordance with an embodiment of the present invention.
Figure 1:
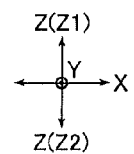
Figure 2:
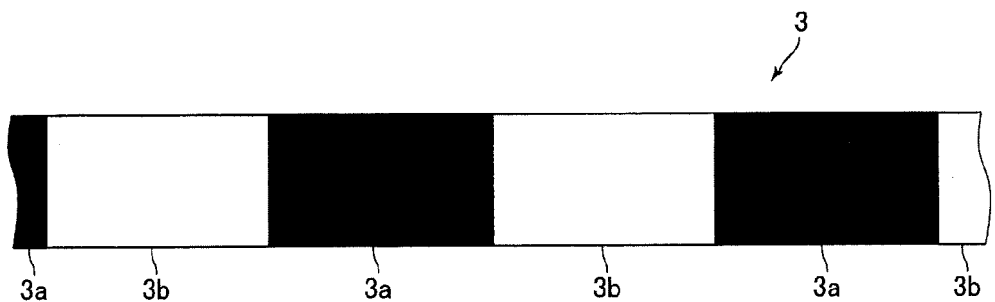
FIG. 2 is a plan view showing a part of an ink ribbon in FIG. 1.
Figure 3:
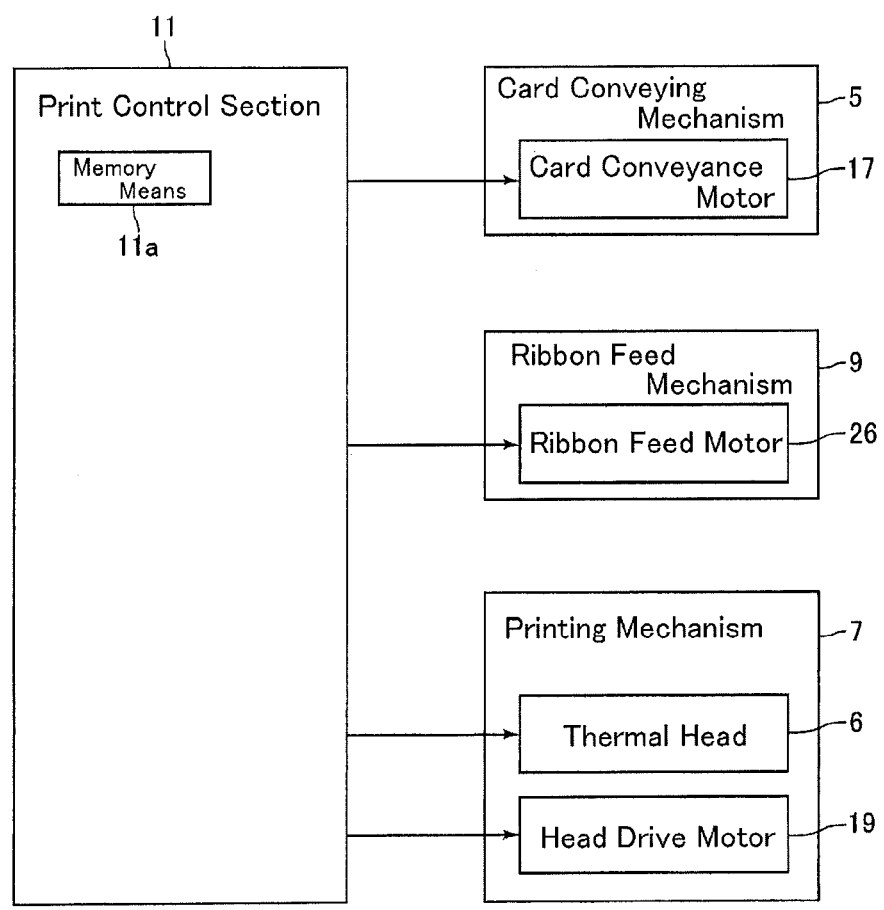
FIG. 3 is a block diagram showing a print control section and structures relating to print control in the card printing device shown in FIG. 1.

FIG. 1 is an explanatory side view showing an internal structure of a card printing device 1 in accordance with an embodiment of the present invention. FIG. 2 is a plan view showing a part of an ink ribbon 3 in FIG. 1. FIG. 3 is a block diagram showing a print control section 11 and structures relating to print control in the card printing device 1 shown in FIG. 1.

The card printing device 1 in this embodiment is a device structured to print a printing image "P" (see FIG. 5) such as characters, signs and figures on a card 2. Specifically, the card printing device 1 is a printing device in a thermal transfer system, in which an ink ribbon 3 is used, which is formed by applying ink on a strip-shaped film, and ink of the ink ribbon 3 is transferred to and printed on a card 2 by applying heat. The card printing device 1 is, for example, mounted on and used in a host device such as a card issuing device.

A card conveying passage 4 where a card 2 is conveyed is formed on an inside of the card printing device 1. The card conveying passage 4 is formed in a straight line shape so as to penetrate through the card printing device 1 in a right and left direction in FIG. 1. The card printing device 1 includes, as shown in FIGS. 1 and 3, a card conveying mechanism 5 structured to convey a card 2 through the card conveying passage 4, a printing mechanism 7 having a thermal head 6, which heats an ink ribbon 3 to transfer and print ink on the card 2, an ink ribbon cartridge 8 (hereinafter, referred to as "cartridge 8") for supplying and winding the ink ribbon 3, a ribbon feed mechanism 9 which feeds the ink ribbon 3 from a ribbon supplying part 21 to a ribbon winding part 22 described below, and a cleaning roller 10 for removing dust and the like stuck to a surface of the card 2 before printing. Further, the card printing device 1 includes a print control section 11 which controls printing on a card 2. The thermal head 6 and the like are accommodated in an inside of the housing 12.

A card 2 in this embodiment is, for example, a card made of vinyl chloride whose thickness is about 0.7-0.8 mm and is formed in a substantially rectangular shape. A surface of the card 2 is, for example, formed with a magnetic stripe in which magnetic data are recorded. An IC chip and an antenna for communication may be incorporated in the card 2. Further, the card 2 may be a PET (polyethylene terephthalate) card whose thickness is about 0.18-0.36 mm or may be a paper card having a predetermined thickness.

In the following descriptions, three directions perpendicular to each other are respectively referred to as an "X" direction, a "Y" direction and a "Z" direction. Further, the "X" direction is referred to as a "front and rear direction", the "Y" direction is a "right and left direction" and the "Z" direction is an "upper and lower direction", and a "Z1" direction side is referred to as an "upper" side and a "Z2" direction side is a "lower" side. In this embodiment, a card 2 is conveyed in the front and rear direction by the card conveying mechanism 5 so that a longitudinal direction of the card 2 formed in a substantially rectangular shape is substantially coincided with the front and rear direction ("X" direction) and a thickness direction of the card 2 is substantially coincided with the upper and lower direction ("Z" direction). In other words, the front and rear direction is a conveyance direction for a card 2 and is a longitudinal direction of the card 2 which is conveyed through the card conveying passage 4. Further, the upper and lower direction is a thickness direction of a card 2 which is conveyed through the card conveying passage 4. Further, the right and left direction ("Y" direction) is a short widthwise direction of a card 2 which is conveyed through the card conveying passage 4.

An ink ribbon 3 is, as shown in FIG. 2, provided with an ink region 3a where an ink layer, that is, a layer of ink to be transferred on a card 2 is formed, and an overcoat region 3b where an overcoat layer, that is a layer of overcoat material for covering a surface of the ink transferred on the card 2 is formed. The ink region 3a and the overcoat region 3b are alternately arranged in a longitudinal direction of the ink ribbon 3 formed in a strip shape. A width of the ink region 3a and a width of the overcoat region 3b in the longitudinal direction of the ink ribbon 3 are substantially equal to each other. Further, the width of the ink region 3a and the width of the overcoat region 3b in the longitudinal direction of the ink ribbon 3 are substantially equal to a width in the longitudinal direction of a card 2

Various inks may be used as ink which is applied to the ink region 3a and color of ink is not limited. Further, the ink ribbon 3 in this embodiment is capable of only monochromatic printing (for example, black) but the ink ribbon 3 capable of printing in a plurality of colors may be utilized. Further, the ink ribbon 3 may be provided with no overcoat region 3b.

The card conveying mechanism 5 includes a plurality of card conveying rollers 15 which are abutted with a card 2 to convey the card 2, and pad rollers 16 which are oppositely disposed to some of the card conveying rollers 15. The card conveying rollers 15 are disposed so as to protrude in the card conveying passage 4 from a lower side. A plurality of the card conveying rollers 15 is connected with a card conveyance motor 17 (see FIG. 2) through a power transmission mechanism structured of pulleys, a timing belt and the like. The card conveyance motor 17 is electrically connected with a print control section 11. The pad roller 16 faces the card conveying roller 15 from an upper side and is urged toward the card conveying roller 15.

The printing mechanism 7 includes, in addition to the thermal head 6, a power transmission mechanism having an eccentric cam 18 and the like, and a head drive motor 19 (see FIG. 2) which is connected with the thermal head 6 through the power transmission mechanism. The thermal head 6 is disposed at the substantially middle in the front and rear direction of the card printing device 1 and on an upper side with respect to the card conveying passage 4. A platen roller 20 is disposed on a lower side with respect to the thermal head 6. A card 2 and the ink ribbon 3 pass through between the thermal head 6 and the platen roller 20 in the upper and lower direction. Further, the thermal head 6 is moved up and down with respect to the card conveying passage 4 (specifically, platen roller 20) by power transmitted from the head drive motor 19. The thermal head 6 is abutted with an upper face of a card 2 with a predetermined abutting force through the ink ribbon 3 and performs printing on the upper face of the card 2 which is conveyed through the card conveying passage 4. The thermal head 6 and the head drive motor 19 are electrically connected with the print control section 11.

The cartridge 8 includes a ribbon supplying part 21 for supplying an ink ribbon 3 toward the thermal head 6 and a ribbon winding part 22 for winding a used ink ribbon 3 after printing by the thermal head 6 is finished. The cartridge 8 is disposed on an upper side with respect to the card conveying passage 4 and is detachably mounted on the housing 12. The ribbon winding part 22 is connected with a ribbon feed motor 26 described below which structures a ribbon feed mechanism 9, through a transmission means such as a gear and the like not shown.

Further, the cartridge 8 includes plural shafts 23 disposed with the right and left direction as its axial direction and a pair of frames (not shown) which are connected with each other through the plural shafts 23. The ribbon supplying part 21 and the ribbon winding part 22 are supported between the pair of the frames. The ink ribbon 3 is guided from the ribbon supplying part 21 to the thermal head 6 and is guided from the thermal head 6 to the ribbon winding part 22 by the plural shafts 23. Further, the ink ribbon 3 is disposed so that its face applied with ink faces a card 2 and its face on an opposite side faces the thermal head 6.

The ribbon feed mechanism 9 includes a ribbon feed roller 24, which is abutted with the ink ribbon 3 to feed the ink ribbon 3, and a pad roller 25 which is oppositely disposed to the ribbon feed roller 24. The ribbon feed roller 24 is disposed on an upper side with respect to the card conveying passage 4 and on a lower side with respect to the ribbon winding part 22. The ribbon feed roller 24 is connected with the ribbon feed motor 26 (see FIG. 2) through a power transmission mechanism structured of pulleys, a timing belt and the like. The ribbon feed motor 26 is electrically connected with the print control section 11. The pad roller 25 faces the ribbon feed roller 24 from an obliquely upper side and is urged toward the ribbon feed roller 24.

A cleaning roller 10 is disposed on one end side in the front and rear direction of the card printing device 1. The cleaning roller 10 cleans an upper face of a card 2 before printing is performed by the thermal head 6.

The housing 12 is structured of a first housing 28 disposed on an upper side and a second housing 29 disposed on a lower side. A shaft 30 which is disposed with the right and left direction as its axial direction is fixed to the first housing 28, and the first housing 28 is capable of turning with respect to the second housing 29 in a clockwise direction (clock direction) in FIG. 1 from a state shown in FIG. 1 with the shaft 30 as a turning center. When the first housing 28 is turned in a clockwise direction with respect to the second housing 29, the cartridge 8 can be taken out from the housing 12.

Print Operation of Card Printing Device

Figure 4:
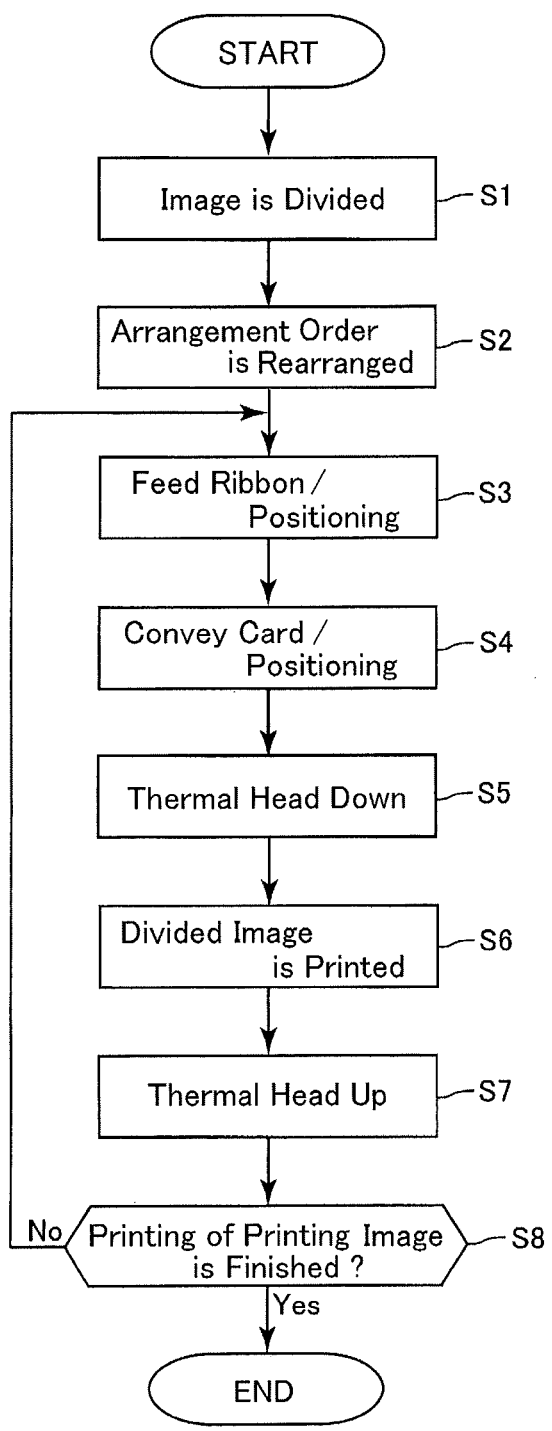
FIG. 4 is a flow chart showing an example of a flow of a print operation in the card printing device shown in FIG. 1.
Figure 5:
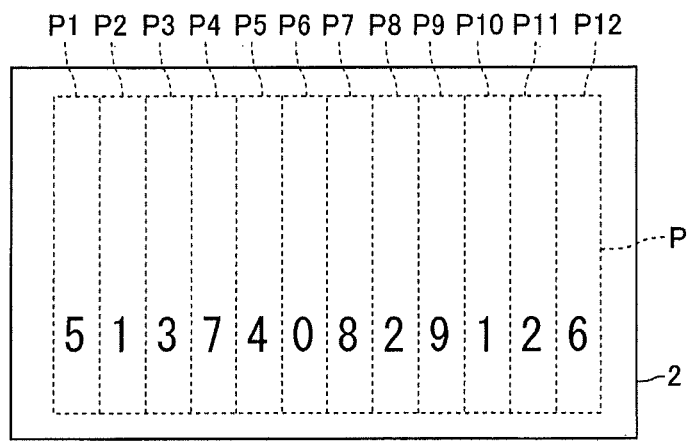
FIG. 5 is a view showing a state of a card after a printing image to be printed has been printed according to the flow shown in FIG. 4.
Figure 6:
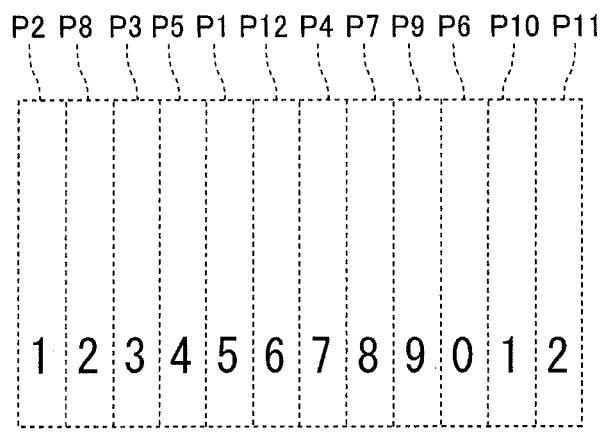
FIG. 6 is a view for explain an example of arrangement of divided images after an arrangement order is rearranged in an arrangement order rearranging step.
Figure 7:
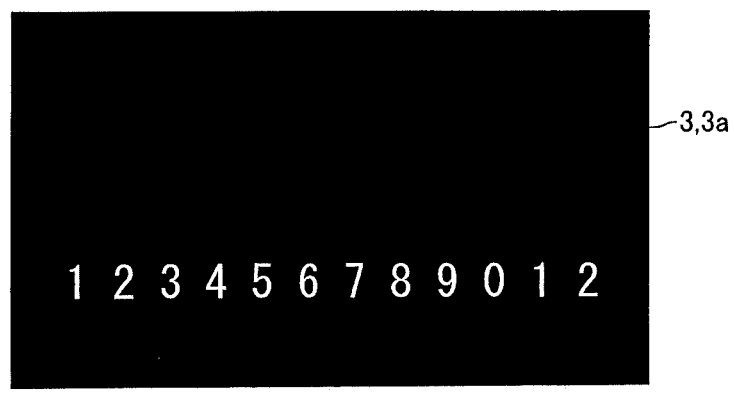
FIG. 7 is a view showing a state of an ink region of an ink ribbon after an image to be printed has been printed on a card according to the flow shown in FIG. 4.
Figure 8A:
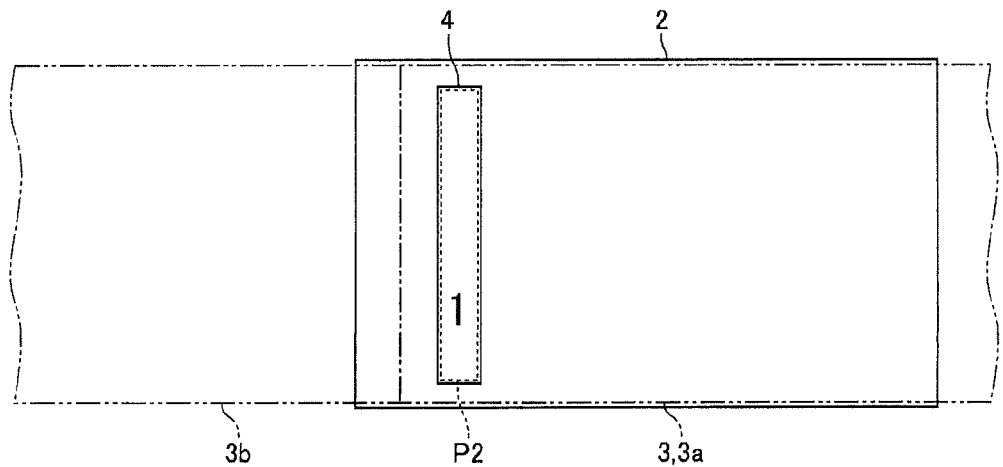
FIGS. 8(A), 8(B) and 8(C) are views for explaining an example of a print operation in a print step.
Figure 8B:
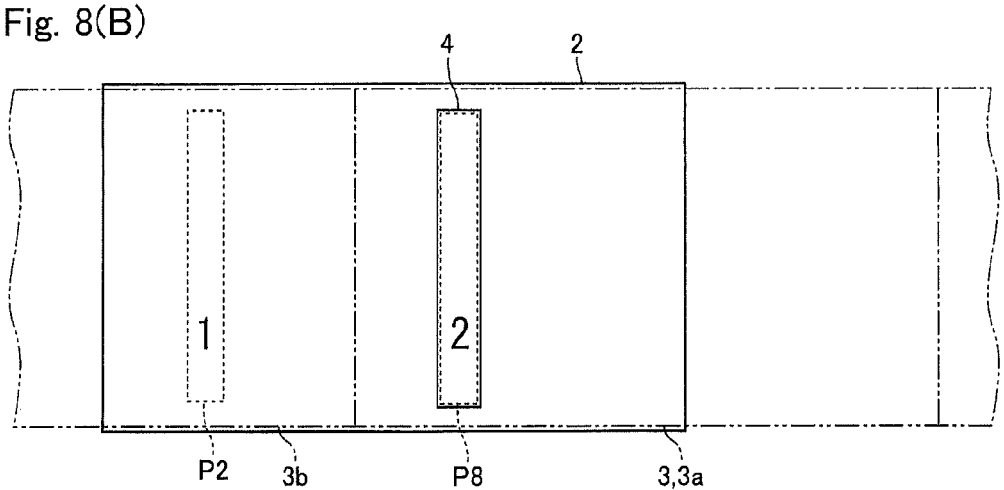
Figure 8C:
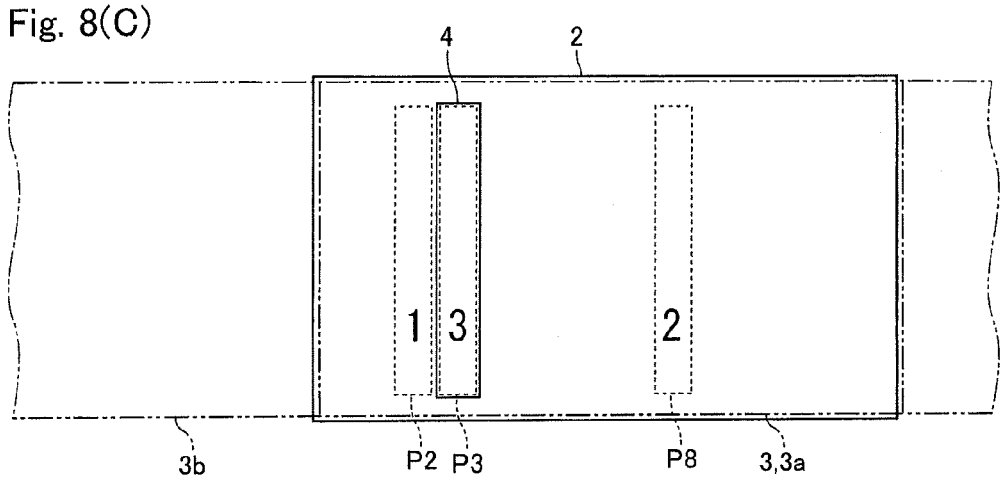

FIG. 4 is a flow chart showing an example of a flow of a print operation in the card printing device 1 shown in FIG. 1. FIG. 5 is a view showing a state of a card 2 after a printing image "P" has been printed according to the flow shown in FIG. 4. FIG. 6 is a view for explaining an example of arrangement of divided images "P1" through "P12" after an arrangement order is rearranged in the step "S2" in FIG. 4. FIG. 7 is a view showing a state of an ink region 3a of an ink ribbon 3 after a printing image "P" has been printed on a card 2 according to the flow shown in FIG. 4. FIGS. 8(A), 8(B) and 8(C) are views for explaining an example of a print operation in the steps "S3" through "S8" shown in FIG. 4.

The print control section 11 in this embodiment divides a printing image "P" to be printed on a card 2 into a plurality of divided images "P1" through "P12" in a conveyance direction (longitudinal direction) of the card 2, and rearranges an arrangement order of the divided images "P1" through "P12" in the conveyance direction of the card 2. In addition, the print control section 11 controls the card conveying mechanism 5 to move the card 2 forward or backward and then prints on the card 2 by the printing mechanism 7 so that the divided images "P1" through "P12" are printed on the card 2 in the order of rearranged order and, so that the card 2 is printed with the divided images "P1" through "P12" in the original arrangement order before having been rearranged. Specifically, the print control section 11 transfers and prints ink on a card 2 as described below.

When the print control section 11 receives a print command for printing on a card 2 from a control section of the host device on which the card printing device 1 is mounted, first, a printing image "P" to be printed on a card 2 is divided into a plurality of divided images "P1" through "P12" in the conveyance direction of the card 2 (step S1). For example, in the step S1, when the print control section 11 receives a print command for printing a code table, which is, as shown in FIG. 5, a digit string comprised of twelve digits arranged in the conveyance direction of the card 2, on a card 2 as a printing image "P", the print control section 11 divides the printing image "P" into twelve divided images "P1" through "P12" which are divided for each digit in the conveyance direction of the card 2. In other words, the print control section 11 divides the printing image "P" into a plurality of divided images "P1" through "P12" at positions corresponding to the delimitations of the respective twelve digits.

Next, the print control section 11 rearranges an arrangement order of the divided images "P1" through "P12" in the conveyance direction of the card 2 (step S2). In the step "S2", the print control section 11 sets, for example, the divided images "P1" through "P12", which are arranged in the order as shown in FIG. 5 in the conveyance direction of the card 2, to rearrange to the order of the divided images "P2", "P8", "P3", "P5", "P1", "P12", "P4", "P7", "P9", "P6", "P10" and "P11" as shown in FIG. 6. The arrangement order of the divided images "P1" through "P12" after having been rearranged is stored in a memory means 11a of the print control section 11.

After that, the print control section 11 controls the ribbon feed motor 26 to feed the ink ribbon 3 to a predetermined position in a forward direction (direction from the ribbon supplying part 21 to the ribbon winding part 22) and the ink ribbon 3 is positioned (step S3). In the step S3, the thermal head 6 is retreated to an upper side. As described below, the steps from the step "S3" to the step "S8" are repeated until printing of the printing image "P" on the card 2 is finished. In this case, in the first step "S3", the ink ribbon 3 is fed to a predetermined reference position. In other words, in the first step "S3", the ink ribbon 3 is positioned to a predetermined reference position for start of printing. Further, in the second and subsequent steps "S3", the ink ribbon 3 is fed in the conveyance direction of a card 2 by each width of the divided images "P1" through "P12".

After that, the print control section 11 controls the card conveyance motor 17 to move the card 2 forward or backward for positioning the card 2 (step S4) so that the divided images "P1" through "P12" are printed on the card 2 in the order of the rearrangement order which is rearranged in the step "S2" (in other words, in the order of the divided images "P2", "P8", "P3", "P5", "P1", "P12", "P4", "P7", "P9", "P6", "P10" and "P11") and, so that the card 2 are printed with the divided images "P1" through "P12" in the original arrangement order before having been rearranged (in other words, the digit string "513740829126" is printed on the card 2).

In this case, the print control section 11 detects the position of the card 2 based on a detection result by an optical sensor not shown and the card 2 is moved forward or backward by a predetermined distance. The optical sensor is, for example, a non-contact type optical sensor comprised of a light emitting element and a light receiving element which are oppositely disposed to each other across the card conveying passage 4. Alternatively, a position of the card 2 may be detected by utilizing an optical type encoder or a magnetic type encoder which is provided in a part of the card conveyance motor 17 or the like.

As described below, the steps from the step "S3" to the step "S8" are repeated until printing of the printing image "P" on the card 2 is finished. In the first step "S4", the print control section 11 moves the card 2 forward or backward to position the card 2 so that the divided image "P2" is printed at the position of the card 2 shown in FIG. 5 (see FIG. 8(A)). Further, in the second step "S4", the print control section 11 moves the card 2 forward or backward to position the card 2 so that the divided image "P8" is printed at the position of the card 2 shown in FIG. 5 (see FIG. 8(B)). Further, in the third step "S4", the print control section 11 moves the card 2 forward or backward to position the card 2 so that the divided image "P3" is printed at the position of the card 2 shown in FIG. 5 (see FIG. 8(C)). Similarly, in the fourth and subsequent steps "S4", the print control section 11 moves the card 2 forward or backward to position the card 2 so that the divided images "P5", "P1", "P12", "P4", "P7", "P9", "P6", "P10" and "P11" are printed at the positions of the card 2 shown in FIG. 5.

Succeeding to the above-mentioned step "S4", the print control section 11 controls the head drive motor 19 to move the thermal head 6 downward so that the thermal head 6 is abutted with an upper face of the card 2 through the ink ribbon 3 with a predetermined abutting force (step S5) and then one of the twelve divided images "P1" through "P12" is printed by the thermal head 6 (step S6). In other words, in the step "S6", one digit for the divided images "P1" through "P12" is printed.

When printing of one of the divided images "P1" through "P12" is finished in the step "S6", the print control section 11 controls the head drive motor 19 to move the thermal head 6 upward (step S7) and, after that, the print control section 11 judges whether or not printing of twelve divided images "P1" through "P12" is finished (in other words, whether printing of the printing image "P" on the card 2 is finished or not) (step S8).

When printing of the printing image "P" on the card 2 is finished in the step "S8" ("Yes" in the step "S8"), printing operation on the one card 2 is finished. On the other hand, in a case that printing of the printing image "P" on the card 2 is not finished in the step "S8" ("No" in the step "S8"), the flow is returned to the step "S3".

As described above, the steps from the step "S3" to the step "S8" are repeated by the number of times corresponding to the number of the divided images until printing of the printing image "P" on the card 2 is finished. In the first step "S6", the divided image "P2" is printed as shown in FIG. 8(A). Further, in the second step "S6", the divided image "P8" is printed as shown in FIG. 8(B) and, in the third step "S6", the divided image "P3" is printed as shown in FIG. 8(C). Similarly, in the fourth and subsequent steps "S4", the divided images "P5", "P1", "P12", "P4", "P7", "P9", "P6", "P10" and "P11" are printed in this order.

When the printing operation on the card 2 is finished, randomly arranged printed traces of ink having the same shape as the divided images "P1" through "P12" are left in the ink region 3a of the ink ribbon 3 as shown in FIG. 7. In other words, the ink region 3a of the used ink ribbon 3 is left with printed traces of the digit string "123456789012" which is structured so that the digit string "513740829126" printed on the card 2 is randomly rearranged (in other words, the digit string which is different from the digit string printed on the card 2).

When the transfer of the ink to the card 2 is finished, the print control section 11 transfers overcoat material to the card 2 for covering the surface of the transferred ink with the overcoat material. The transfer of the overcoat material to the card 2 is similarly performed to the transfer of the ink on the card 2. For example, transfer of the overcoat material to the card 2 is also performed according to the steps "S1" through "S8" or according to the steps "S3" through "S8". Therefore, transferred trace of the digit string different from the digit string which is printed on the card 2 is left in the overcoat region 3b of the used ink ribbon 3.

Further, in a case that a width of the thermal head 6 in a print direction (front and rear direction) is smaller than a width of a digit to be printed on the card 2 and thus, printing of one digit for the divided images "P1" through "P12" cannot be completed with one time operation in the step "S6", the thermal head 6 is repeatedly moved up and down while intermittently feeding the card 2 and the ink ribbon 3 in the forward direction in the step "S6" to perform printing of the one digit for the divided images "P1" through "P12".

Further, in the second and subsequent steps "S4", the card 2 is directly moved forward or backward to the print positions of the next divided images "P1" through "P12", or the card 2 is moved forward or backward to the print positions of the next divided images "P1" through "P12" after the card 2 has been moved to a predetermined home position. For example, the card 2 is directly moved forward from the position shown in FIG. 8(A) to the position shown in FIG. 8(B), and the card 2 is directly moved backward from the position shown in FIG. 8(B) to the position shown in FIG. 8(C). Alternatively, for example, after the card 2 is moved forward or backward once from the position shown in FIG. 8(A) to a predetermined home position, the card 2 is moved forward or backward to the position shown in FIG. 8(B) and, after the card 2 is moved forward or backward once from the position shown in FIG. 8(B) to the predetermined home position, the card 2 is moved forward or backward to the position shown in FIG. 8(C).

The step "S1" in this embodiment is an image dividing step in which a printing image "P" to be printed on a card 2 is divided into a plurality of divided images "P1" through "P12" in the conveyance direction of the card 2. The step "S2" is an arrangement order rearranging step in which an arrangement order of the divided images "P1" through "P12" in the conveyance direction of the card 2 is rearranged. Further, the steps "S3" through "S8" are a print step in which printing on the card 2 is performed by the printing mechanism 7 after the card conveying mechanism 5 is controlled to move the card forward or backward so that the divided images "P1" through "P12" are printed on the card 2 in the order of arrangement order having been rearranged, and so that the card 2 is printed with the divided images "P1" through "P12" in the arrangement order before rearranged.

Principal Effects in this Embodiment

As described above, in this embodiment, the print control section 11 divides a printing image "P" to be printed on a card 2 into a plurality of divided images "P1" through "P12" in a conveyance direction of the card 2, and rearranges an arrangement order of the divided images "P1" through "P12" in the conveyance direction of the card 2, and then, the print control section 11 controls the card conveying mechanism 5 to move the card 2 forward or backward and then prints on the card 2 by the thermal head 6 so that the divided images "P1" through "P12" are printed on the card 2 in the order of arrangement order having been rearranged and, so that the card 2 is printed with the divided images "P1" through "P12" in the original arrangement order before rearranged.

Therefore, in this embodiment, randomly arranged printed traces of ink having the same shape as the divided images "P1" through "P12" are left in the used ink ribbon 3. Therefore, according to this embodiment, unless printed traces which are left in the used ink ribbon 3 are analyzed in detail, the printing image "P" which is printed on the card 2 cannot be acquired. In other words, in this embodiment, the printing image "P" to be printed on the card 2 can be prevented from being easily acquired from the printed traces of the ink which are left in the used ink ribbon 3. Further, in this embodiment, the card 2 is moved forward or backward by the card conveying mechanism 5 so that the divided images "P1" through "P12" whose arrangement order has been rearranged are printed on the card 2 in the order of the arrangement order having been rearranged in the conveyance direction of the card 2 and, so that the card 2 is printed with the divided images "P1" through "P12" in the original arrangement order before having been rearranged in the conveyance direction of the card 2. Therefore, a mechanism for feeding the ink ribbon 3 in a reverse direction (direction for feeing from the ribbon winding part 22 to the ribbon supplying part 21) is not required to provide in the card printing device 1. Accordingly, in this embodiment, the structure of the card printing device 1 can be simplified.

In this embodiment, in the step "S1", the print control section 11 divides the printing image "P" which is a code table into twelve divided images "P1" through "P12" which are divided into each one digit in the conveyance direction of the card 2. Therefore, the respective digits of the code table are accurately printed on the card 2 while preventing the code table having a high confidentiality from being easily acquired from the printed traces of the ink which are left in the used ink ribbon 3.

In this embodiment, in the second and subsequent steps "S4", the card 2 is directly moved forward or backward to the print position of the next divided images "P1" through "P12", or the card 2 is moved forward or backward to the print position of the next divided images "P1" through "P12" after the card 2 has been moved to a predetermined home position. In the second and subsequent steps "S4", in a case that the card 2 is directly moved forward or backward to the print position of the next divided images "P1" through "P12", a printing time of the printing image "P" on the card 2 can be shortened. Further, in a case that the card 2 is moved forward or backward to the print position of the next divided images "P1" through "P12" after the card 2 has been moved to a predetermined home position, stopping accuracy of the card 2 can be enhanced and thus accuracy of the print positions of the respective divided images "P1" through "P12" with respect to the card 2 can be enhanced. According to this embodiment, since rigidity of the card 2 is relatively high, in the second and subsequent steps "S4", even when the card 2 is moved forward or backward in either method, the stopping accuracy of the card 2 can be secured and, as a result, accuracy of the print positions of the respective divided images "P1" through "P12" with respect to the card 2 can be secured.

Other Embodiments

Although the present invention has been shown and described with reference to a specific embodiment, various changes and modifications will be apparent to those skilled in the art from the teachings herein.

Figure 9:
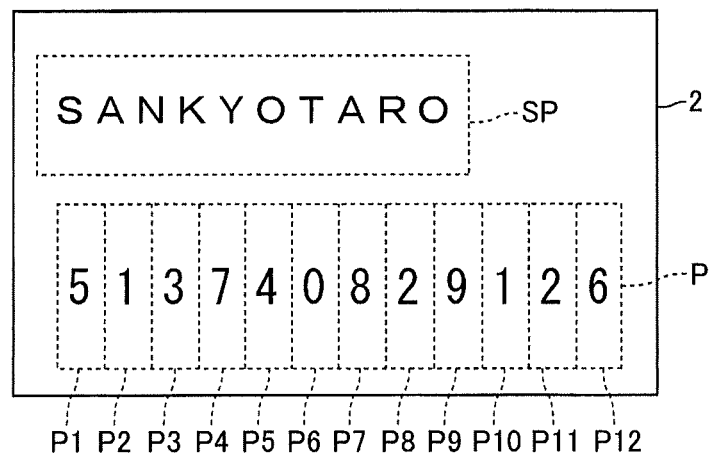
FIG. 9 is a view showing a card in accordance with another embodiment of the present invention.

In the embodiment described above, as shown in FIG. 5, a code table comprised of a digit string of twelve digits is printed on the card 2 as a printing image "P" to be printed. However, the present invention is not limited to this embodiment. For example, as shown in FIG. 9, in addition to the printing image "P" (digit string of twelve digits), the name of a card owner ("SANKYOTARO" in the example shown in FIG. 9) may be printed on the card 2 as a second printing image "SP" to be printed. As shown in FIG. 9, the printing image "P" and the second printing image "SP" are printed in a separated state with a predetermined distance therebetween in a short widthwise direction of the card 2.

Figure 10:
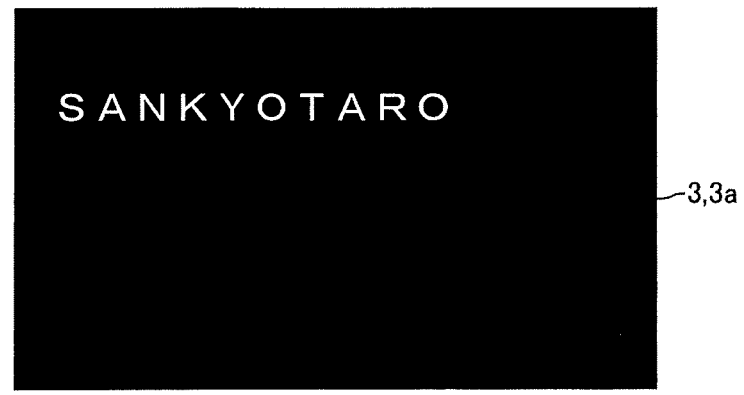
FIG. 10 is a view showing a state of an ink region of an ink ribbon after a second image to be printed in FIG. 9 has been printed.
Figure 11:
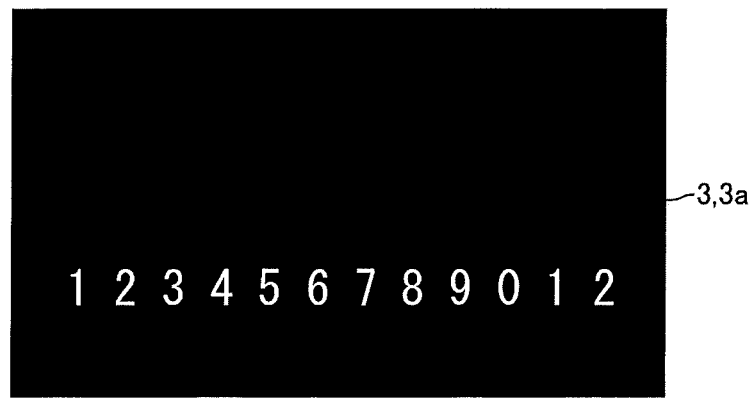
FIG. 11 is a view showing a state of an ink region of an ink ribbon after an image to be printed in FIG. 9 has been printed.

In this case, it is preferable that the second printing image "SP" is printed according to a second print step which is separately provided from the steps "S1" through "S8" and another ink region 3a different from the ink region 3a of the ink ribbon 3 which is used in the steps "S1" through "S8" is used in the second print step. In other words, it is preferable that, after the printing image "P" has been printed by using one ink region 3a according to the flow shown in FIG. 4, or before the printing image "P" is printed, the second printing image "SP" is printed by using the ink region 3a which is different from the ink region 3a used for printing the printing image "P". When printed as described above, the printed traces of characters of "SANKYOTARO" are left in the ink region 3a used for printing the second printing image "SP" as shown in FIG. 10, and the ink region 3a used for printing the printing image "P" is, similarly to the above-mentioned embodiment, left with the printed traces of the digit string "123456789012" as shown in FIG. 11.

In accordance with an embodiment of the present invention, in the printing of the second printing image "SP", it may be controlled that the second printing image "SP" is divided into a plurality of divided images in a conveyance direction of the card 2, and an arrangement order of the divided images is rearranged in the conveyance direction of the card 2, and then, the card conveying mechanism 5 is controlled to move the card 2 forward or backward so that the divided images are printed on the card 2 in the order of arrangement order having been rearranged and, so that the card 2 is printed with the divided images in the original arrangement order before rearranged, and printing is performed on the card 2 by the thermal head 6. In this case, the ink region 3a which is used for printing the second printing image "SP" is left with the printed traces of a character string which is different from the name "SANKYOTARO" printed on the card 2.

In a case that the positions of the digits structuring the printing image "P" and the positions of the characters structuring the second printing image "SP" are displaced from each other in the conveyance direction of the card 2 as shown in FIG. 9, when the second printing image "SP" is divided into a plurality of divided images in the conveyance direction of the card 2 together with the printing image "P" and an arrangement order of the divided images in the conveyance direction of the card 2 is rearranged and the divided images are printed on the card 2 in the rearranged order having been rearranged, for example, one of the characters structuring the second printing image "SP" may be divided halfway and inconsistency occurs in its connected portion and thus, the second printing image "SP" is not printed adequately. On the other hand, when the second printing image "SP" is printed according to the second print step which is separately provided from the steps "S1" through "S8", occurrence of the above-mentioned problem is prevented and the second print image "SP" is adequately printed on the card 2.

Further, in a case that the printed traces of the ink having the same shape as the randomly arranged divided images of the second printing image "SP" (in other words, divided images of the name) are left in the used ink ribbon 3, the name of the card owner (in other words, the second printing image "SP") printed on the card 2 may be relatively easily analyzed from the printed traces. In this case, when the second printing image "SP" is divided into a plurality of divided images in the conveyance direction of the card 2 together with the printing image "P" and an arrangement order of the divided images in the conveyance direction of the card 2 is rearranged and the divided images are printed on the card 2 in the rearranged order having been rearranged, not only the image of the second printing image "SP" but also the image of the printing image "P" (in other words, the image of a code table having high confidentiality) may be relatively easily acquired from the printed traces of the ink having the same shape as the divided images left in the used ink ribbon 3. On the other hand, in a case that the second printing image "SP" is printed according to the second print step which is separately provided from the steps "S1" through "S8", even when that the second printing image "SP" is acquired easily, the image of the printing image "P" can be prevented from being acquired easily.

In the embodiment described above, in the step "S1", the printing image "P" comprised of a digit string of twelve digits is divided into twelve divided images "P1" through "P12" each of which contains one character. However, the present invention is not limited to this embodiment. For example, in the step "S1", the printing image "P" comprised of a digit string of twelve digits may be divided into six divided images each of which contains two characters, or may be divided into four divided images each of which contains three characters. In this case, a printing time of the printing image "P" on a card 2 can be shortened. Further, the number of the characters contained in each of the divided images may be different from each other. For example, the printing image "P" may be divided into four divided images, i.e., two divided images which respectively contain two characters and two divided images which respectively contain four characters. As described above, when the printing image "P" is divided into a plurality of divided images at positions corresponding to delimitations of a plurality of digits, the respective digits of the printing image "P" can be accurately printed on a card 2.

In the embodiment described above, the printing image "P" is a code table comprised of a digit string of twelve digits but, for example, the printing image "P" may be, a code table comprised of a character string of plural characters or may be a code table comprised of a combination of plural digits and plural characters. Further, the printing image "P" is not limited to a code table.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A card printing device for use with a card, the card printing device comprising:
   a card conveying mechanism which conveys the card through a card conveying passage;
   a printing mechanism which transfers and prints ink applied to an ink ribbon on the card which is conveyed along the card conveying passage; and
   a print control section which controls printing on the card;
   wherein the print control section divides a printing image to be printed on the card into a plurality of divided images in a conveyance direction of the card, rearranges an arrangement order of the divided images in the conveyance direction of the card, controls the card conveying mechanism to move the card forward or backward so that the divided images are printed on the card in a rearranged order and, so that the card is printed with the divided images in an original arrangement order before having been rearranged and then, performs printing on the card by the printing mechanism.

2. The card printing device according to claim 1, wherein
   the printing image is a code table comprised of a plurality of digits or a plurality of characters, and
   the print control section divides the printing image into a plurality of divided images at positions corresponding to delimitations of the plurality of the digits or the plurality of the characters.

3. A control method for a card printing device including a card conveying mechanism structured to convey a card through a card conveying passage, and a printing mechanism which transfers and prints ink applied to an ink ribbon on the card which is conveyed along the card conveying passage, the control method comprising:
   dividing a printing image to be printed on the card is divided into a plurality of divided images in a conveyance direction of the card;
   rearranging an arrangement order of the divided images in the conveyance direction of the card; and
   moving the card forward or backward so that the divided images are printed on the card in a rearranged order and, so that the card is printed with the divided images in an original arrangement order before having been rearranged and then, printing on the card is performed by the printing mechanism.

4. The control method for a card printing device according to claim 3, wherein after one divided image is printed on the card, the card is directly moved forward or backward to a print position for the next divided image.

5. The control method for a card printing device according to claim 3, wherein the card is moved forward or backward to a predetermined home position before printing of each of the plurality of the divided images is performed on the card, and then the card is moved forward or backward to a print position of the divided image.

6. The control method for a card printing device according to claim 3, wherein
   the card is printed with the printing image and a second printing image which are printed in a separated state with a predetermined distance therebetween in a direction perpendicular to the conveyance direction of the card and a thickness direction of the card, and
   the second printing image is printed separately provided from the dividing a printing image, the rearranging an arrangement order, and the moving the card forward or backward so that the divided images are printed on the card in a rearranged order.

7. The control method for a card printing device according to claim 3, wherein
   the printing image is a code table comprised of a plurality of digits or a plurality of characters, and
   in the dividing a printing image, the printing image is divided into a plurality of divided images at positions corresponding to delimitations of the plurality of the digits or the plurality of the characters.

* * * * *